(12) United States Patent
Gatten et al.

(10) Patent No.: US 8,335,607 B2
(45) Date of Patent: Dec. 18, 2012

(54) METHOD AND APPARATUS FOR LINKING ELECTRIC DRIVE VEHICLES

(75) Inventors: Ronald A Gatten, Pleasanton, CA (US); Bradley T. Sykes, Mill Valley, CA (US); Jong Noah Fong, Castro Valley, CA (US)

(73) Assignee: Ronald A. Gatten, Pleasanton, CA (US)

( * ) Notice: Subject to any disclaimer, the term of this patent is extended or adjusted under 35 U.S.C. 154(b) by 179 days.

(21) Appl. No.: 12/704,893

(22) Filed: Feb. 12, 2010

(65) Prior Publication Data
US 2011/0202212 A1   Aug. 18, 2011

(51) Int. Cl.
*G01M 17/00* (2006.01)
*B62D 53/00* (2006.01)
*B62B 1/00* (2006.01)
*G08B 21/00* (2006.01)

(52) U.S. Cl. ....... 701/31.1; 180/14.2; 280/656; 340/431

(58) Field of Classification Search ............... 701/22, 701/31.1; 340/431, 438; 180/14.1–14.5; 280/418.1, 423.1, 430, 462, 656, 789
See application file for complete search history.

(56) References Cited

U.S. PATENT DOCUMENTS

| | | | |
|---|---|---|---|
| 4,650,205 | A | 3/1987 | Jarlsson |
| 4,794,867 | A | 1/1989 | Titz |
| 4,813,695 | A | 3/1989 | Reid |
| 5,456,520 | A | 10/1995 | Adams et al. |
| 5,924,716 | A | 7/1999 | Burkhart, Sr. et al. |
| 6,036,217 | A | 3/2000 | Burkhart, Sr. et al. |
| 6,193,257 | B1 | 2/2001 | Lutz |
| 6,663,131 | B2 | 12/2003 | Evans |
| 6,668,729 | B1 | 12/2003 | Richards |

(Continued)

FOREIGN PATENT DOCUMENTS

JP    2001-222790    *   8/2001

(Continued)

OTHER PUBLICATIONS

Japanese Patent No. 2004-222790; Publication Date: Aug. 17, 2001; Abstract Only; 1 Page.

(Continued)

*Primary Examiner* — James Trammell
*Assistant Examiner* — Muhammad Shafi
(74) *Attorney, Agent, or Firm* — Cantor Colburn LLP

(57) ABSTRACT

In one embodiment a control system for linking a plurality of electrically driven road vehicles together is disclosed, the control system having: a coupling input and a coupling output disposed on each of the plurality of vehicles, each coupling input of each vehicle being configured to releasably engage each coupling output of another vehicle to provide a mechanical and electrical coupling of the plurality of vehicles together; and a control system located on each of the plurality of vehicles, the control system communicating with the coupling input and the coupling output to detect when the coupling input or the coupling output is engaged with another vehicle via a respective coupling input or coupling output, the control system being further configured to operate in a lead vehicle mode or a trailing vehicle mode when the control system detects that the coupling input or the coupling output is engaged with another vehicle, wherein the lead vehicle mode causes the control system of the lead vehicle to control another vehicle coupled to the lead vehicle and the trailing vehicle mode causes the control system to be controlled by the lead vehicle coupled to the vehicle.

19 Claims, 9 Drawing Sheets

U.S. PATENT DOCUMENTS

| | | | |
|---|---|---|---|
| 7,219,913 B2 | 5/2007 | Atley | |
| 7,416,039 B1 | 8/2008 | Anderson et al. | |
| 7,430,967 B2 | 10/2008 | Kumar | |
| 7,547,179 B1 | 6/2009 | Edmonson | |
| 8,086,396 B1 * | 12/2011 | Farwell et al. | 701/482 |

FOREIGN PATENT DOCUMENTS

| | | |
|---|---|---|
| JP | 2001222790 A | 8/2001 |
| JP | 2008178184 A | 7/2008 |
| WO | WO0187684 A1 | 11/2001 |
| WO | WO0223296 A1 | 3/2002 |

OTHER PUBLICATIONS

Japanese Patent No. 2008-178184; Publication Date: Jul. 31, 2008; Abstract Only; 1 Page.

International Search Report; International Application No. PCT/US2011/023920; International Filing Date: Feb. 7, 2011; Date of Mailing: Nov. 9, 2011; 4 Pages.

Written Opinion of the International Searching Authority; International Application No. PCT/US2011/023920; International Filing Date: Feb. 7, 2011; Date of Mailing: Nov. 9, 2011; 5 Pages.

* cited by examiner

METHOD AND APPARATUS FOR LINKING ELECTRIC DRIVE VEHICLES

BACKGROUND

Various embodiments of the present invention relate to an apparatus and method for linking electric drive motor vehicles.

Overuse of fossil fuels and vehicle congestion on roadways proximate to cities has led to numerous attempts to reduce fuel consumption and reduce traffic congestion.

Accordingly, it is desirable to provide a method and apparatus for linking a plurality of electrically driven road vehicles together.

SUMMARY OF THE INVENTION

In accordance with exemplary embodiments of the present invention, a system for linking electric drive motor vehicles is disclosed. In one non-limiting embodiment, a lead vehicle controls the speed and direction of a plurality of linked vehicles.

In one exemplary embodiment a control system for linking a plurality of electrically driven road vehicles together is disclosed, the control system having: a coupling input and a coupling output disposed on each of the plurality of vehicles, each coupling input of each vehicle being configured to releasably engage each coupling output of another vehicle to provide a mechanical and electrical coupling of the plurality of vehicles together; and a control system located on each of the plurality of vehicles, the control system communicating with the coupling input and the coupling output to detect when the coupling input or the coupling output is engaged with another vehicle via a respective coupling input or coupling output, the control system being further configured to operate in a lead vehicle mode or a trailing vehicle mode when the control system detects that the coupling input or the coupling output is engaged with another vehicle, wherein the lead vehicle mode causes the control system of the lead vehicle to control another vehicle coupled to the lead vehicle and the trailing vehicle mode causes the control system to be controlled by the lead vehicle coupled to the vehicle.

In another exemplary embodiment, a method of linking a plurality of electrically driven road vehicles together is provided. In this embodiment, each of the plurality of electrically driven road vehicles has a coupling input and a coupling output, each coupling input of each vehicle being configured to releasably engage each coupling output of another vehicle to provide a mechanical and electrical coupling of the plurality of vehicles together and the method includes the steps of: coupling a first lead vehicle to at least one other vehicle by a vehicle coupling comprising: a coupling input of the first lead vehicle and a coupling output of a trailing vehicle, the coupling output of the trailing vehicle being secured to the coupling input of the first lead vehicle; and a communications link between the first lead vehicle and the trailing vehicle; controlling the trailing vehicle by exchanging control signals between a control system located on each of the first lead vehicle and the trailing vehicle, wherein at least a portion of the control signals being exchanged are electrically transferred through the communications link between the first lead vehicle and the trailing vehicle; and controlling at least one of a braking, acceleration, a deceleration, a recharging and a steering of the trailing vehicle by inputting a command into the control system of the trailing vehicle, wherein the command originates from the control system of the first lead vehicle and the command is transferred through the communications link.

The above-described and other features are appreciated and understood by those skilled in the art from the following detailed description, drawings, and appended claims.

DETAILED DESCRIPTION OF EXEMPLARY EMBODIMENTS

Figure 1A:
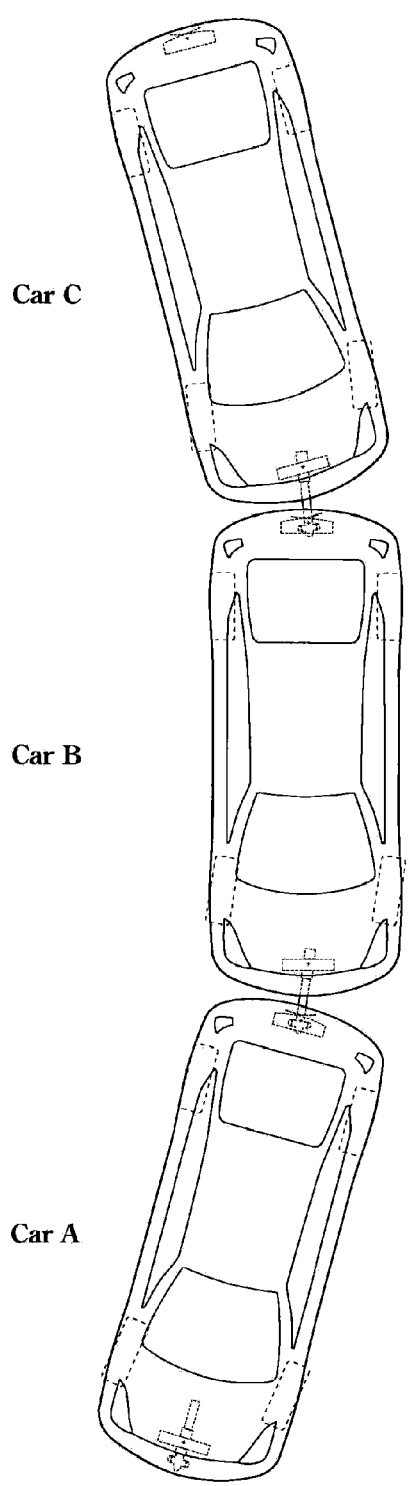
FIG. 1A is a topside view of vehicles coupled together in accordance with exemplary embodiments of the present invention.
Figure 1B:
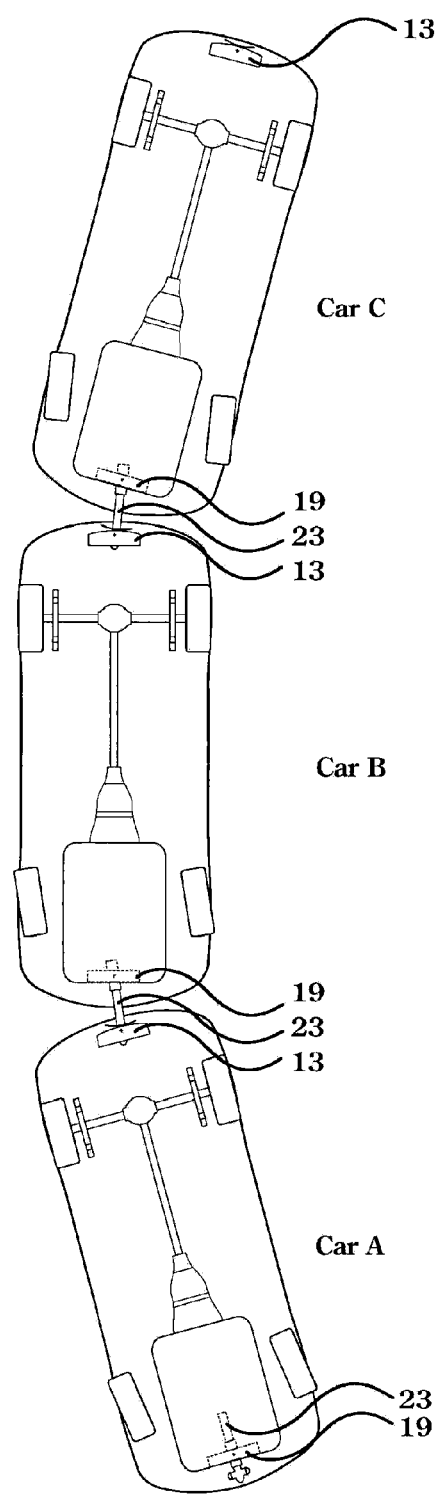
FIG. 1B is the underside view of the vehicles in FIG. 1A.

In accordance with exemplary embodiments of the present invention, a system for linking electric drive motor vehicles is disclosed. In one non-limiting embodiment, a lead vehicle controls the speed and direction of a plurality of linked vehicles.

In various embodiments a control system for linking a plurality of electrically driven road vehicles together is disclosed, the control system having: a coupling input and a coupling output disposed on each of the plurality of vehicles, each coupling input of each vehicle being configured to releasably engage each coupling output of another vehicle to provide a mechanical and electrical coupling of the plurality of vehicles together; and a control system located on each of the plurality of vehicles, the control system communicating with the coupling input and the coupling output to detect when the coupling input or the coupling output is engaged with another vehicle via a respective coupling input or coupling output, the control system being further configured to operate in a lead vehicle mode or a trailing vehicle mode when the control system detects that the coupling input or the coupling output is engaged with another vehicle, wherein the lead vehicle mode causes the control system of the lead vehicle to control another vehicle coupled to the lead vehicle and the trailing vehicle mode causes the control system to be controlled by the lead vehicle coupled to the vehicle.

A system of electro-mechanical interconnection of electric vehicles will be described herein. The system will allow a number of electric drive vehicles (cars) to link together wherein the driver in the lead car can control the motion of all the linked cars that follow the lead car. In one embodiment, each car utilizes its own electric drive propulsion means even when linked together however, the speed and direction of the linked cars is controlled by the lead car. Accordingly and when the driver of the lead car initiates an acceleration the linkage system electronically signals all other linked cars to accelerate at the same rate. The resulting acceleration of each car is synchronous and precisely controlled. In addition and when the driver of the lead car signals a deceleration all the linked cars synchronously decelerate. Furthermore and when the driver of the lead car makes a turn the linked cars that follow are made to turn in the same direction. Accordingly, acceleration, deceleration and turning of the system are accomplished through electro-mechanical "linkage" hardware, electronics, and software contained in each of the individual linked cars. The operation of linking cars together is automated electro-mechanically. Another added feature is that when each car can be quickly linked or unlinked by drivers from inside of their vehicle this may be accomplished even when the vehicles are joined together and in motion.

One advantage of an exemplary embodiment of the present invention is that drivers are free to perform other activities. For example, once the cars are linked together the drivers of the cars which follow the lead car no longer have to "drive" (e.g., accelerate, decelerate, and steer) their own car since the driver in the lead car performs the driving functions for all the linked cars. Thus, the other drivers are thus free to do other activities while in transit. This freedom is particularly valuable to those who are stuck in slow moving commuter traffic and/or those who are traveling long distances.

Another advantage of an exemplary embodiment of the present invention is that driver roadway efficiency is improved. For example, the close proximity between linked cars provides a significant reduction in traffic congestion since the drivers of unlinked cars need to allow a distance between cars for safety. Cars that are linked as described herein do not require this gap. Therefore, the linked cars improve the flow of traffic and reduce traffic congestion.

Another advantage is improved safety since the linked cars may provide improvements in safety. For example and when an unlinked individual car brakes in traffic, the driver of the car directly following the braking car must first see the brake lights, anticipate the deceleration rate and try using best judgment to brake at a rate consistent with that required. Accordingly, the linked cars remove some of the element of human error in that the braking is instant and synchronous. In addition and in one embodiment, all the linked cars are electronically controlled to brake at the same time and at the same rate. Also, in the extreme event where one linked car were to slip, say on an icy roadway, the mechanical coupling element of the linkage, as well as pneumatic bumpers, located at identical heights between cars, will constrain slippage.

Still another advantage is reduced driver fatigue the linked cars reduce driver fatigue because only one driver is needed to control all the linked cars. Accordingly, the drivers of cars who are linked to the lead car are free to use the transit time to personal advantage, doing such activities as reading, relaxing, or working on a computer.

Another advantage is the possibility of energy transfer while in transit. Here the system offers an opportunity of the linked car system to transfer electric power between vehicles. In one embodiment, the energy transfer is a commercial transaction wherein one vehicle buys energy from another. This functionality is made achievable through the power transfer capability of the described multi-element system linkage.

When a number of cars are linked together in close proximity by the system of electro-mechanical linkage described herein the resulting packet of linked cars can be synchronously controlled in speed and direction by the forward most (lead) car in the packet.

Another objective of exemplary embodiments of the present invention is to encourage implementation and standardization of a universal vehicular linkage system.

Referring now to the attached FIGS. the coupling of the vehicles is illustrated and described. In one embodiment, mechanical coupling is attained between a series of electrically driven motorized vehicles and one means of implementing position alignment and engagement of the linkage assemblies is by way of electronically controlled hydraulic actuators and motors. However, electrical actuators and motors or equivalents thereof could be used instead of hydraulic. Hydraulics have some advantages in cost, reliability and power to weight ratio, which is why hydraulic actuators are universally used in the braking systems of motorized vehicles.

During the linkage process mechanical coupling takes place when two electrically driven motorized vehicles are in close physical proximity. The lead vehicle is referred to as car A and the trailing vehicle is referred to as car B. If more vehicles were linked together in a packet they would be referred to sequentially as car C, car D, car E, etc. See FIG. 1A, which shows the topside view of three cars, A, B and C, linked together.

Figure 2:
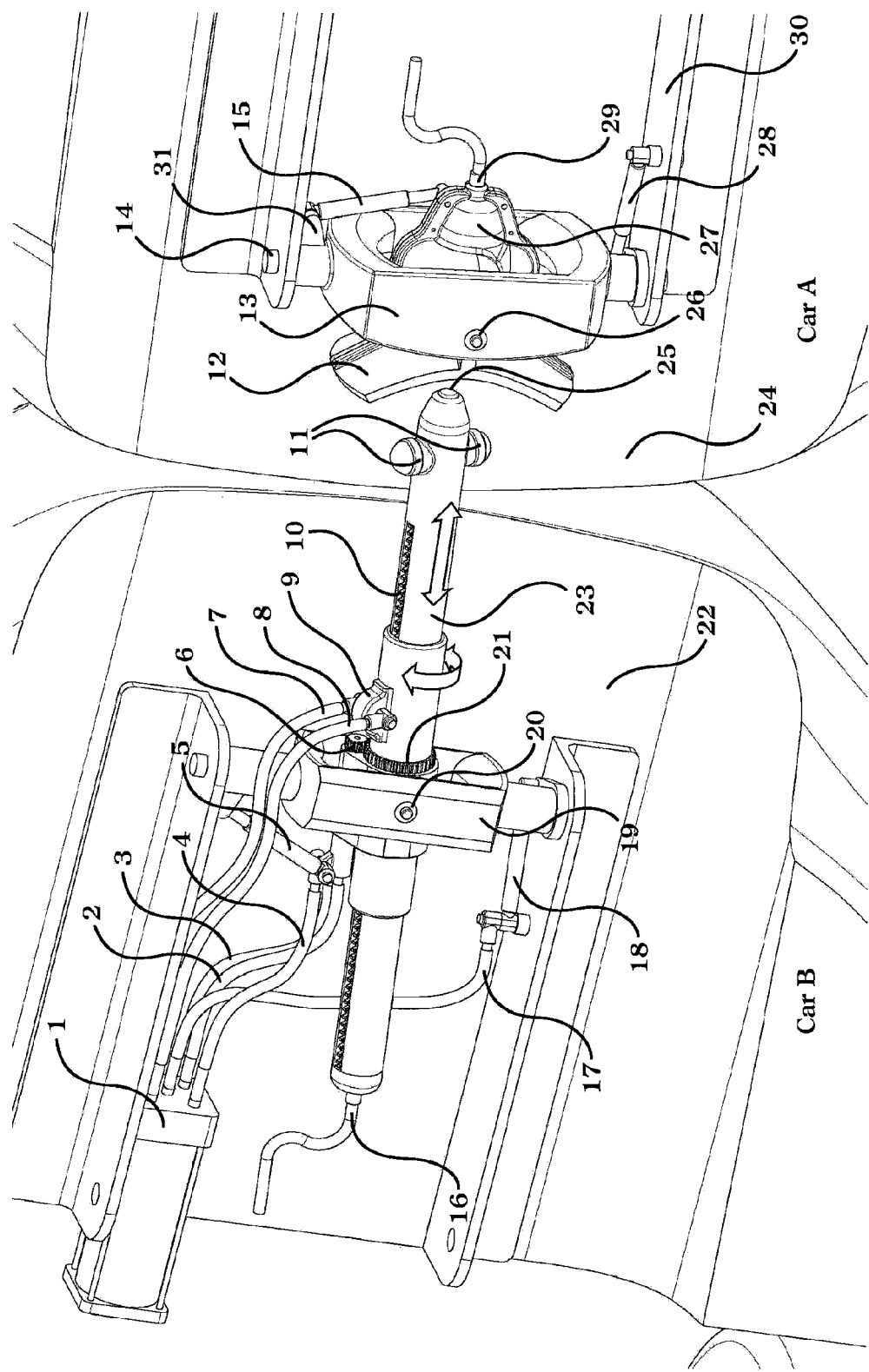
FIG. 2 illustrates linkage mechanisms of two vehicles prior to being linked together.

Referring to FIG. 2, a mechanical arm 23 from the linkage mechanism of car B is extended forward to engage in a receiver assembly 12 of car A. Mechanical arm 23 is extendable by way of a hydraulic gear drive 9 which is rotated to extend arm 23 by way of hydraulic fluid drive coming from a hydraulic actuator 1 providing hydraulic drive fluid to a hydraulic gear drive motor 9 through hydraulic hose 7. Fluid through hydraulic gear drive motor 9 is returned to hydraulic actuator 1 through a hydraulic hose 8. Mechanical arm 23 is retracted by way of hydraulic fluid drive coming from hydraulic actuator 1 which provides hydraulic drive fluid through hydraulic hose 8 which reverses the direction of hydraulic gear drive motor 9. During the retraction of arm 23 fluid is returned from hydraulic gear drive motor 9 to hydraulic actuator 1 through hydraulic hose 7.

Horizontal alignment of mechanical arm 23 of car B with the linkage receptor 12 of car A is accomplished by way of controlled hydraulic fluid flow from hydraulic actuator 1 through hydraulic hose 4 to a spring loaded hydraulic piston 5. Increasing flow to piston 5 moves arm 23 horizontally in one direction. Decreasing hydraulic flow volume, through hydraulic hose 4 to piston 5, results in movement of arm 23 in an opposite horizontal direction.

Vertical alignment of mechanical arm 23 of car B with the linkage receptor 12 of car A is accomplished by controlled hydraulic fluid flow from hydraulic actuator 1 through hydraulic hose 17 to a spring loaded hydraulic piston 18. Increasing pressure to piston 18 moves arm 23 downward and decreasing pressure moves the arm upward.

The mechanical gear of hydraulic gear drive motor 9 of FIG. 2 engages gear track 10 of arm 23. Gear track 10 is shown in more detail in FIG. 4, which also shows mechanical arm 23 of car B fully engaged in receiver 12. The engaging rotational pins 11 on each side of mechanical arm 23 are shown fully rotated so that pins 11 of arm 23 have rotationally attached arm 23 to receiver assembly 12. Arm 23 cannot be removed from receiver 12 without rotating arm 23 in the opposite direction to disengage or unlink the cars.

For mechanical engagement between car B and car A arm 23 is extended as described previously by applying fluid through hose 7 to hydraulic gear drive 9. During extension of arm 23, the arm enters receiver assembly 12 of car A. To fully engage or attach arm 23 into receiver assembly 12 arm 23 of car B is rotated in the direction shown by arrow 31 of FIG. 4. The rotation is accomplished by fluid pressure applied from hydraulic controller 1 through hose 2 to rotational actuator gear 6. The return fluid path for actuator gear 6 is by way of hydraulic hose 3 which allows fluid to flow back to hydraulic controller 1. To reverse and disengage arm 23 from receiver 12 requires reverse rotational power to actuator gear 6 which hydraulic power is applied through hose 3 and with the fluid return path now being through hose 2 to hydraulic controller 1. Although hydraulic actuators are illustrated, exemplary embodiments of the present invention contemplate other equivalent mechanical coupling and decoupling of the vehicles and are thus within the scope of exemplary embodiments of the present invention. Therefore, exemplary embodiments are not limited to the specific mechanisms illustrated herein.

Figure 3:
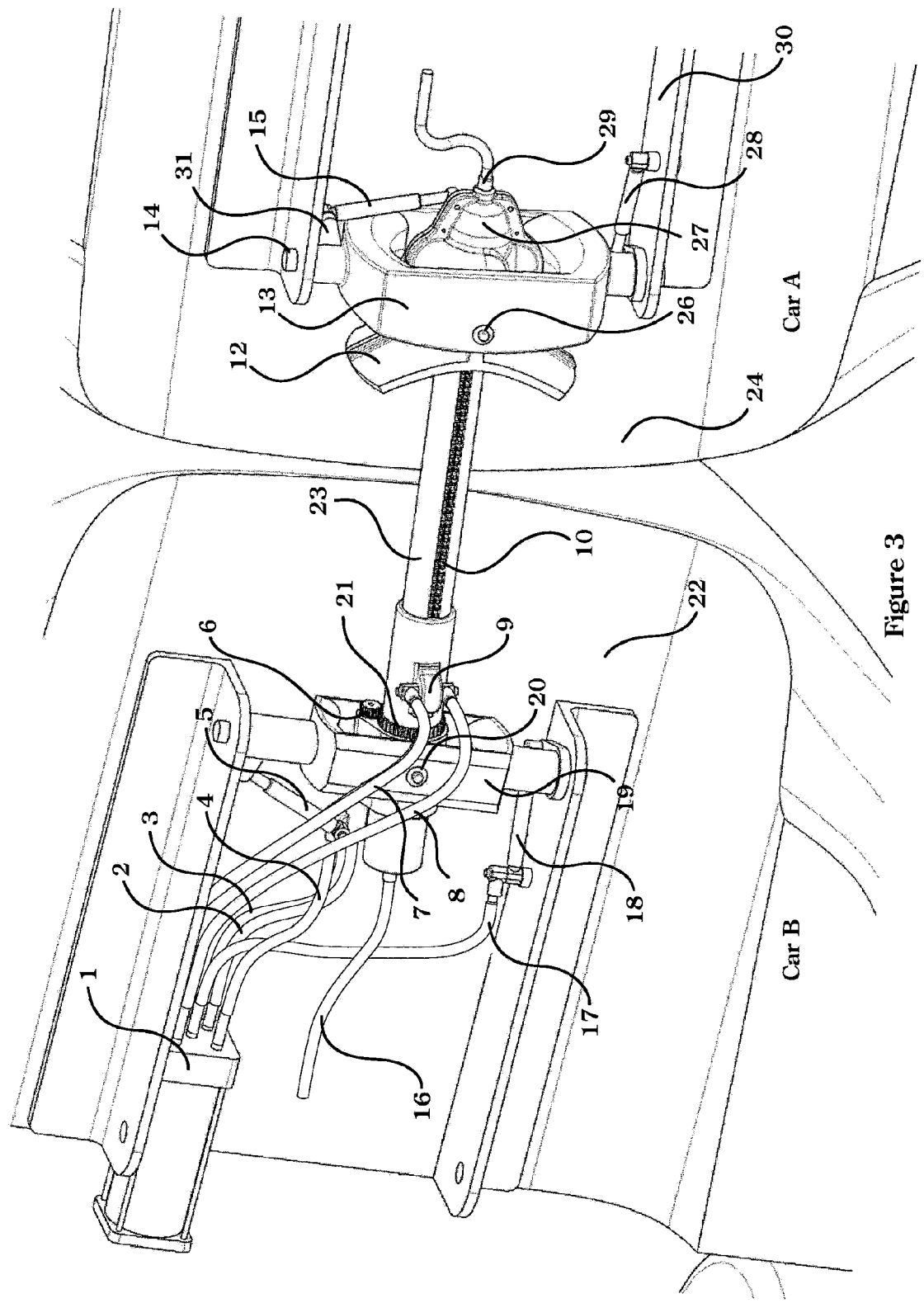
FIG. 3 illustrates linkage mechanisms of two vehicles after they are linked together.

Electrical engagement between the cars will now be described referring now to FIG. 2, an insulated electrical cable 16 protrudes through a hollow portion in the center of arm 23 and makes electrical connection with contact 25 at the tip of arm 23. The electrically conductive shield of cable 16 attaches to the outside metal of arm 23 at the point where cable 16 enters the hollow center of arm 23. Mechanical engagement and attachment of mechanical arm 23 to receiver 12 of car A, as shown in FIG. 3 and in detail in FIG. 4, allows simultaneous electrical engagement of an electrically conductive path between the center conductor of electrical cable 16 of car B through electrical contact 25 of arm 23 to electrically conductive cable 29 of car A. Because each car has a cable electrically connecting its respective electrical cable 16 through link arm 29 to cable 29 of a linked car, all cars that are linked in a packet share an electrical conduction path that extends through all the cars in the packet.

Flow of electric current requires both an outgoing and a return path. The return path of cables 29 and 16 are through the conductive metal in arm 23. Continuity of this return path is by way of electrically conductive rotational pins 11 of arm 23 which make electrical contact between the metal of arm 23 and receiver assembly 12 of car A and from there to and through the external electrically conductive shield of electrical cable 29. Cable 29 has electrical insulation between the center conductor, which transfers power and signal, and the electrically conductive external shield of cable 29 which provides an electrical return path.

The return electrical current of arm 23 of car B flows from the engaging end of arm 23 to the opposite end of arm 23 where the shield of electrical conductor 16 is attached to arm 23 to allow for electrical continuity.

Figure 4:
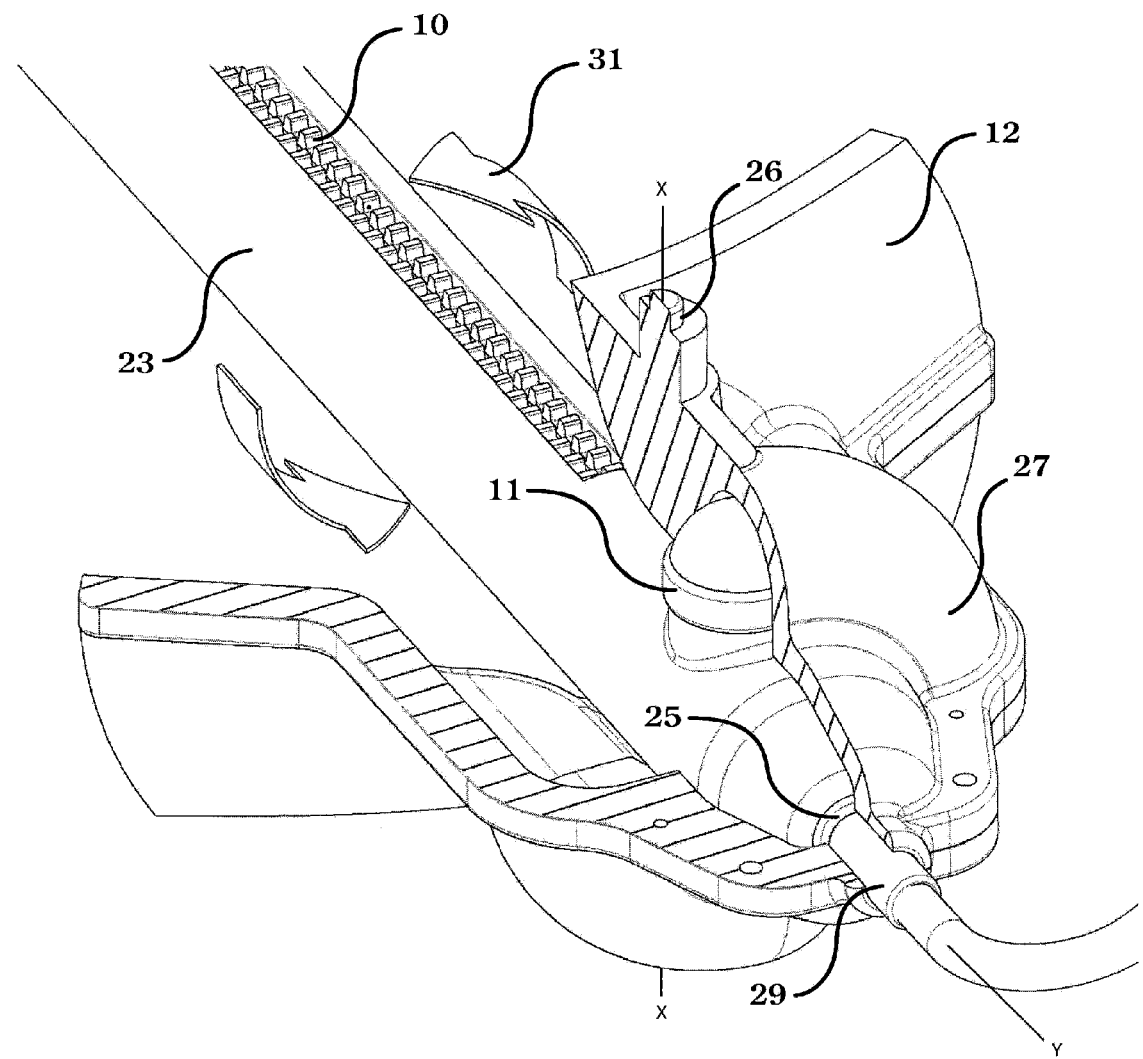
FIG. 4 illustrates component parts of linking elements of two vehicles.

FIG. 4 shows a sectional view of Receiver 12. It also provides a detailed view of rotational and electrical conductive pins 11, which make contact with receiver 12.

Figure 6:
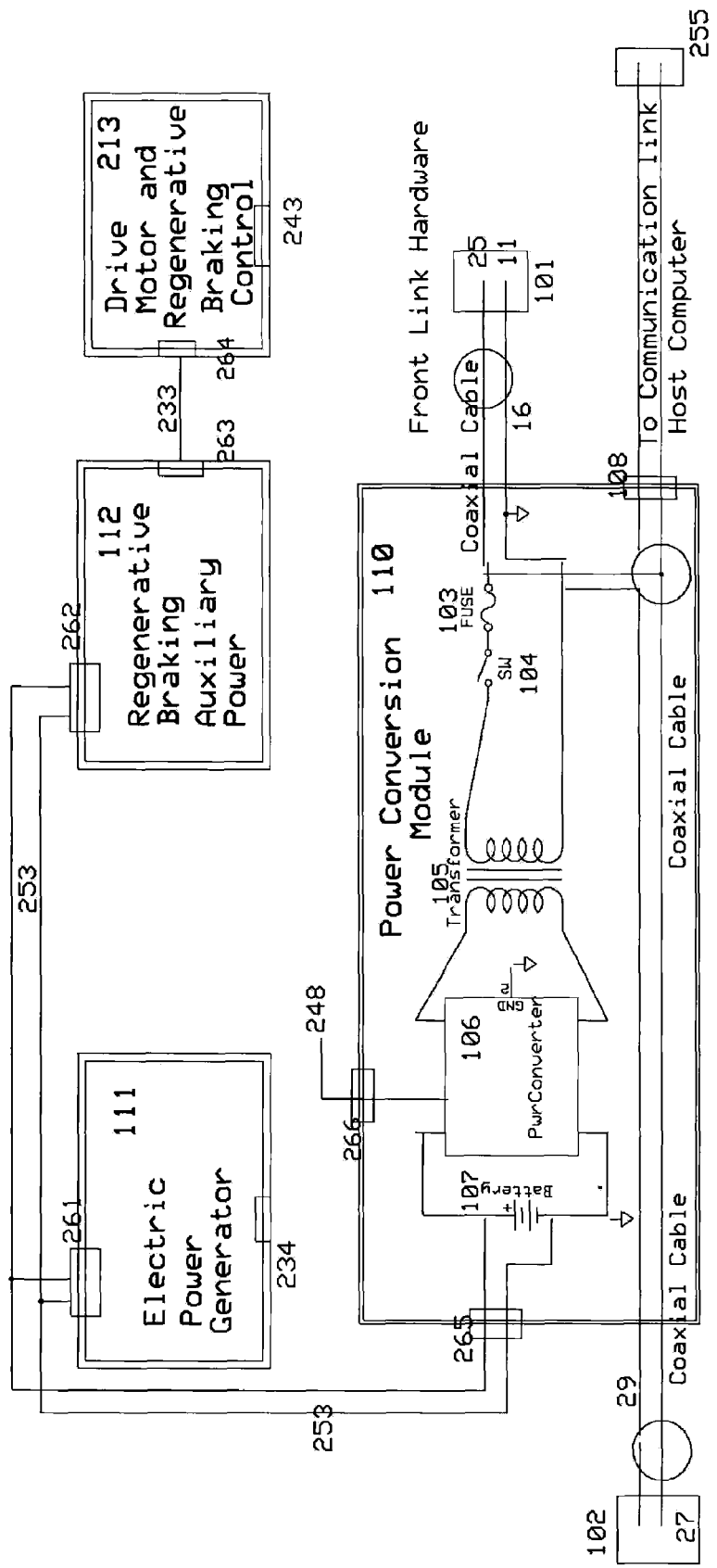
FIG. 6 is a block diagram of a power conversion system in accordance with one non-limiting exemplary embodiment.

To enhance safety, the electrical power return path is tied to the electrical neutral (chassis) of the electrical power system of each car. In this way the voltage at the external surface of arm 23 is neutral in relation to the frame and body of the car. FIG. 6 illustrates an electrical schematic of a power conversion system in accordance with one non-limiting exemplary embodiment of the present invention.

The mounting and motion dynamics of receiver 12 will now be described. FIG. 2 shows mount pins 14 on either side of receiver housing 13. These mount pins allow housing 13 to pivot up and down as may be required when arm 23 is engaging receiver assembly 12. Dampener 28 is an "air-shock" motion dampener with a spring inside to hold a nominal extension position. Dampener 28 is attached on one end to receiver housing 13 and on its other end to support frame 30.

Motion dampener 28 keeps housing 13, and therefore receiver 12, vertically centered up and down when receiver 12 is disengaged from arm 23. Receiver 12 is free to pivot horizontally from side to side, as constrained by mount pins 26 on the top and bottom of receiver housing 13. However, spring loaded pneumatic dampener 15, which is attached on one end to bracket 31 of housing 13 and at its other end to receiver 12 near 29, constrains receiver 12 to be centered horizontally when arm 23 is not engaged with receiver assembly 12.

When cars are in the process of linking it is important that the distance between vehicles as well as other positional alignment aspects be communicated back to the linkage control computerized system. A present automotive industry standard for sensing position is by way of ultrasonic sensors. This type of sensor is commonly mounted in the bumpers of larger vehicles so that when backing up, for example, they can determine if an object is behind and how far back it is positioned. The means of communicating this information to the driver is usually auditory feedback whereby a beeping sound tells the driver that something is behind. The frequency of this auditory beeping lets the driver know approximately how close the object is. In a similar manner ultrasonic sensors can be located in linkable cars in either the front or rear of a vehicle, to sense alignment between cars. Such positional feedback information means as well as others, like optical camera or low power laser, are standard industrial sensor means whereby positional information can be provided to computer control systems. The hardware for such sensing means is available off-the-shelf and will be of significant value to the described automotive linkage control system.

In a similar way to aligning vehicles for linkage the alignment of the link engaging arm 23, described herein, can include sensor hardware such as ultrasonic or optical or laser proximity sensing to assist the control computer in positioning the link arm of the trailing vehicle into the receiver of the leading vehicle.

Referring now to FIG. 6, the circuitry depicted is replicated in each linked car for power conversion. A power conversion module 110 can transfer alternating current electrical power to and received electrical power from linked cars. The schematic of FIG. 6 also shows a means of storing electrical power by way of battery 107.

The schematic of FIG. 6 also shows how power conversion circuitry is connected internally in each car. Note the electrical continuity between forward cable 16 and rearward cable 29. Cable 16 is associated with a quick connection 101, composed of mechanical parts 25 and 11 in the front linkage of a car. Cable 29 is associated with quick connection 102, mechanical component 27, and is integral to the rear linkage of the same car.

FIG. 3 is a view of two cars linked together and shows the rear linkage of one car, Car A, with its respective cable 29. Car A has its linkage engaged with a trailing car, car B, which has its front linkage associated with its own power cable 16. As will be discussed herein elements in Car A, will need to be distinguished for example, from those identically replicated in Car B. To do so we can referred to elements such as cable 16 of Car A as cable 16-A. The identical cable elements in Car B would then be referred to as cable 16-B. Similarly, Power Conversion Module 110 of Car B would be referred to as 110-B and the equivalent Power Conversion Module for Car A would be 110-A.

The electrical connector shown schematically as 101 in FIG. 6 is composed of rotational pins 11 and electrical contact 25 in the mechanical drawing of FIG. 2. In FIG. 6 connector 101 is shown with its dual contacts connected to shielded cable 16 which passes internally through the extendable coupling 23 and on to power conversion module 110. Connector 102 is associated with cable 29.

Electrical continuity is thereby provided internally through each car and externally between cars through the electrical connection hardware of the physical linkage. As illustrated in FIG. 6, when transferring electrical power between cars a signal is received at connector 266, which signal enables power converter 106 to convert direct current power, DC, stored in battery 107 to alternating current power, AC. This AC power, typically operating at a frequency of hundreds of kilohertz, is coupled through transformer 105, then through switch 104 and protective fuse 103 to connectors 101 and 102. From there the power is coupled and transferred to other cars that are linked together.

If power is to be received from other cars instead of being transferred to other cars, then a different signal is received through cable 248 at connector 266. This signal now configures power converter 106 to convert AC power being received from other cars. This power is also received through coaxial cable 29 or cable 16 and the converter now converts this incoming power into DC power which is stored in battery 107. As is the case in transferring power to other cars the receiving of power from other cars is through cable 29 or cable 16 and through connectors 101 or 102. Once the received AC power is conducted through connector 101 or 102 it is then conducted through fuse 103 and switch 104 and coupled through transformer 105 to the converter. When receiving power the converter is now capable of conversion of AC power to DC power which is then stored in battery 107.

Figure 5:
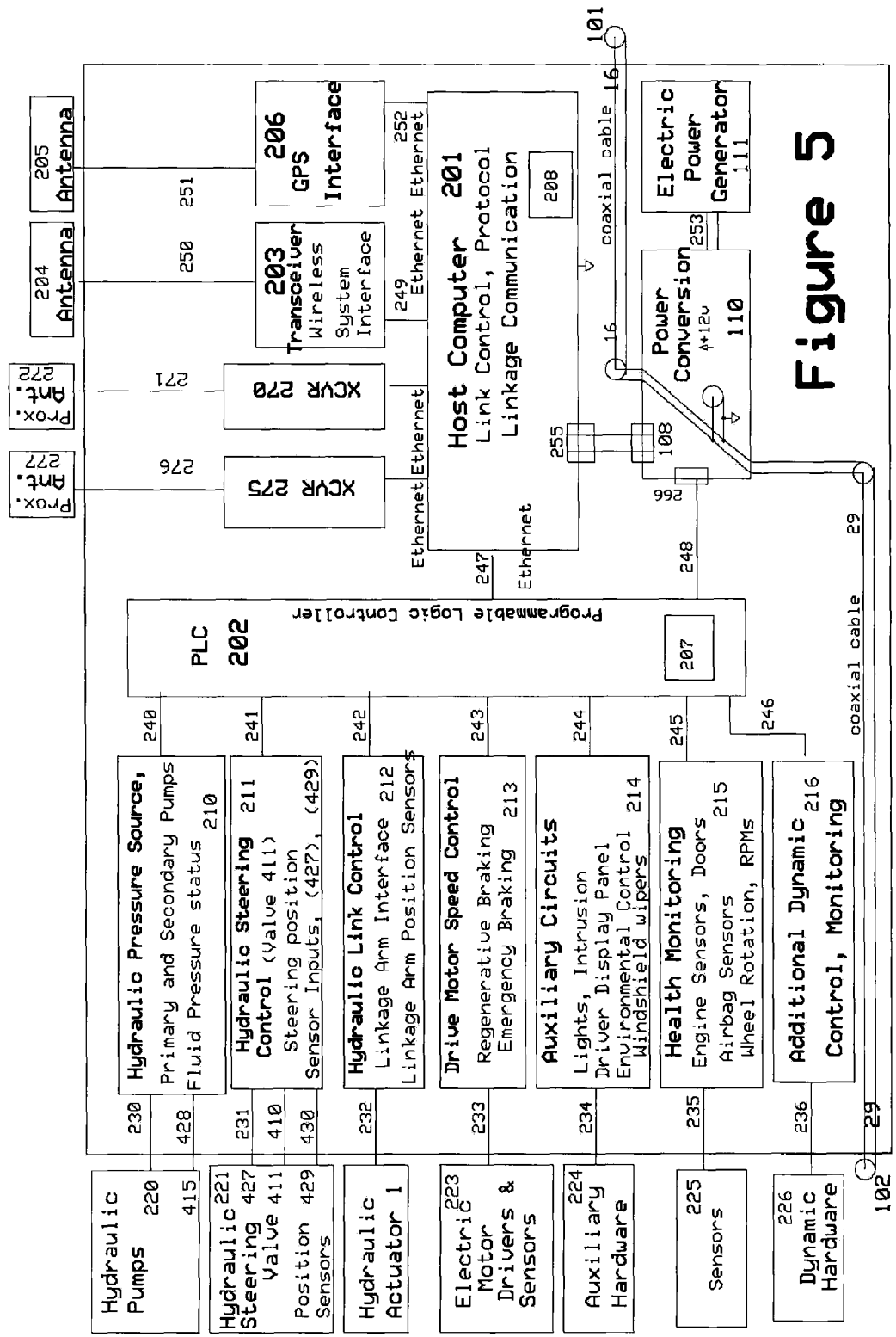
FIG. 5 is a block diagram of a system in accordance with one non-limiting exemplary embodiment of the present invention.

FIG. 5 is a block diagram of system electronics including the electronic control and communication hardware of the linkage system. Within the dual processor host computer 201, resides both in the physical layer and application layer protocol functions described later as "Protocol Layers". Also, resident is driver software and hardware needed to interface with commercial transceiver 203. This transceiver provides radio intercommunication between vehicles. This intercommunication is used for pre-linkage control negotiation and for backup emergency protocol communication should the primary electrical conduction path fail. GPS antenna, 205, and commercially available GPS equipment, 206, are also connected to computer 201 for purposes which are auxiliary to linkage. Radio frequency communication can be used in conjunction with the GPS system to exchange present locations and desired destinations prior to linkage.

Also within the dual processor host computer 201 of FIG. 5 resides intercommunication hardware and software for normal transmission between linked cars by way of close proximity transceivers XCVR 270 located in the front of each car and XCVR 275 located in the rear of each car.

Signal and control electronics are sent and received to and from other linked cars according to the pre-defined protocol. In the event of a failure of this primary communication path, of close proximity wireless transceivers 270 and 275, a backup communication protocol can be initiated utilizing secondary wireless radio transceiver 203 and antenna 204.

The primary function of the programmable logic controller (PLC) 202 is to allow logically sequenced and predictably timed control of various sub-system components such electric drive motors, hydraulic pumps, gears, solenoids, valves, windshield wipers, electric lighting, and sensors for system health-monitoring. The PLC also provides electrical hardware interface to sub-system components.

The following is an example of how the PLC functions within the system. In this example, a description of the overall system control of mechanical arm 23 is provided. Referring now to FIG. 5, the block entitled "Hydraulic Actuator 1" represents the hydraulic actuator that provides fluid flow to hydraulic pistons and hydraulic gears associated with dynamic positioning of arm 23. In order to initiate motion in arm 23 electrical control signals are sent from the host computer 201 by way of high speed Ethernet communication link or other equivalent data transmission means to the programmable logic controller (PLC) 202. The PLC in turn interfaces with the hydraulic link control circuitry 212, which in turn drives solenoids in hydraulic actuator 1. Applying electrical power to solenoids in hydraulic actuator 1 allows hydraulic fluid to flow to various pistons and gears associated with positioning mechanical arm 23. Hence the PLC, at the command of the host computer can actuate hydraulic pistons and gears to move the arm 23 left or right, up or down, in and out. In this way the host computer 201 can tell the PLC where to position arm 23 during the link-up process. Because the host computer of one car can communicate, via its wireless system interface transceiver 203 and Antenna 204 directly with the antenna and transceiver of another car, link-up information can be exchanged between the host computers of the cars. Once the PLC has arm 23 in position with receptor 12 of the car to be linked to then host computer 201 can instruct PLC 202 to rotate arm 23, thereby securing the mechanical coupling between cars.

Upgrade improvements in electronic control systems, control algorithms or communication protocols are to be expected as equipment evolves. In order to assure that older vehicles can be upgraded certain defined communication and control functions, especially those containing software will be modularized. Modularization will help to assure that when upgrade improvements are implemented accurate and certifiable control can be assured by control of the upgrade as a module. Software module 208 of host computer 201 is a replaceable non-volatile memory chip module which can be changed-out to upgrade communication and control software. Similarly, software module 207 of programmable logic controller 202 represents a replaceable non-volatile memory chip module that can also be changed out in order to upgrade the linkage system.

Figure 9:
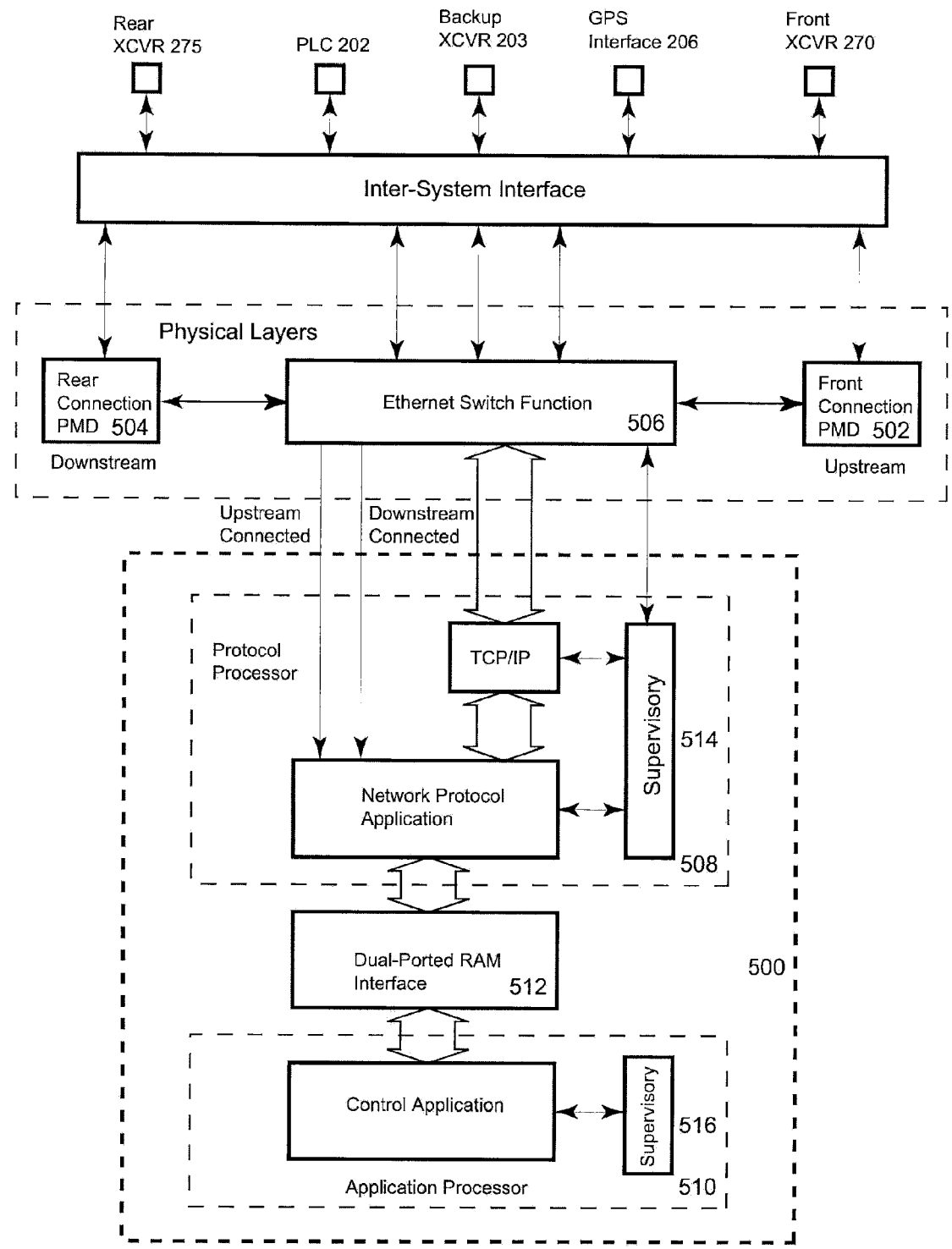
FIG. 9 is a block diagram of embedded control software and hardware communication protocol associated with the Host Computer.

Referring now to FIG. 9 described is an embodiment useful to the implementation of electrical control and communication aspects of the multi-element linkage. A block diagram of embedded control software and hardware, communication protocol of an exemplary embodiment is illustrated. FIG. 9 schematically illustrates a control system 500, of Host Computer 201, for linking a plurality of electrically driven road vehicles together. As illustrated, the control system of each vehicle has a coupling input or front connection PMD 502 and a coupling output or rear connection PMD 504, each coupling input of each vehicle is configured to releasably engage each coupling output of another vehicle to provide a mechanical and electrical coupling of the plurality of vehicles together. The control system is configured to communicate with the coupling input and the coupling output to detect when the coupling input or the coupling output is engaged with another vehicle via a respective coupling input or coupling output. Through the use of hardware and software control the control system will be configured to operate in either a lead vehicle mode or a trailing vehicle mode and communication architecture utilize Ethernet as the standard for physical network connection between vehicles. Ethernet is a data link and physical layer protocol defined by IEEE 802.3 specification. Each vehicle will carry the equivalent of a hub (or switch) 506. In a packet of vehicles, the resulting network cascades through a series of Ethernet hubs one disposed on each vehicle.

The messaging can be handled over TCP/IP, a well-developed protocol commonly supplied by most operating systems. The wide-spread use and success of this protocol is a developmental advantage in terms of ease of implementation and tools for further development. It will operate in a non-connection-oriented mode so that the connection verification and error-handling protocol is performed in the application layer. TCP/IP is commonly used in a non-connection-oriented mode.

At the application layer, it is essential to provide error handling, as consequences for transmission errors can be severe. Each application must be capable of being a master or a slave. The lead car in any packet of linked cars will automatically be a master. An added sophistication must also exist as the lead car may become a slave car if it gives up its lead status to link behind another car. In this case there is a required protocol software method to pass master information to the new master.

In FIG. 9, computer processes at the physical layers, PMD 504 and PMD 502, will signal both the actual, physical connections between the cars and the associated wireless protocol transmission. FIG. 5 schematically shows the Ethernet physical connections between the link control and communication of Host Computer 201 and transceivers, XCVR 270 and XCVR 275 located in the front and rear of each car. In FIG. 9, PMD 502, is logically associated with the front wireless transmitter, XCTR 270, while PMD 504 is associated with wireless transmitter, XCTR 275 in the rear of the car. Electronically, in the signal-handling sense, the physical layers (PMD and PHY) can be off-the-shelf components.

Two processors 508, 510 (Dual Processors) will simplify the implementation of the application by providing a logical separation between the TCP/IP component and the application component. Medium-speed 16-bit processors, along with an appropriate architecture, will be adequate to handle the needed tasks in light of present-day technology where processors have extremely high performance.

A dual-ported RAM 512 will serve as the interface between the two processors. Message status and packet information will be stored in the DPRAM. The use of semaphores will coordinate the use of the DPRAM space. Interrupts will allow more effective signaling of status and information.

The dual-ported RAM will effectively be a messaging center, a place where all messages in either direction will collect and be available for all the processes.

Beyond the physical layers, the bulk of the functionality will be handled by software components. It is important to place high priority on reliability of operation, given the mission critical nature of the operation.

Each of the processors will have a supervisory module 514, 516 performing the "operating system" functions, providing resources of each routine to operate, coordinate activities, and schedule activities. There is no need for the full flexibility of a traditional operating system. Included in the suite of services it provides are the following: allocation of memory and resources for the running of routines; driver interfaces to physical devices; scheduling of routines by providing scheduled, limited depth, time-slicing; and interrupt service routines.

The supervisory module will schedule primary routines to run in such a fashion as to provide a constant update of vital information at no more than 20 msec intervals, or 50 times per second or any other suitable rate. At this rate, a packet of vehicles moving at a speed of 60 miles per hour will travel approximately 1.8 feet between status updates.

Routines running in the Protocol Processor 508 will handle all communications functions of the linked packet of cars. The higher level of protocols can be implemented with TCP/IP. All appropriate information and status will be digested into information packets, which are inserted into the Dual-Ported RAM. Semaphores will be activated to signal the application process that fresh information has been inserted.

The main vehicle control application will run in the second processor 510. Fed by data from the protocol processor, the control application will make all status updates and necessary operational decisions. Any information to be fed to the packet of linked cars will also make use of the dual-ported RAM message center.

Within the electronic hardware and software protocol a lead car is referred to as a "master" and will have logical priorities and processes within the various communication layers which are unique to the role of a lead car (speed control, braking, steering, etc.) even if no other cars are linked to it. Other linked cars in the packet that are not lead cars are then referred to as "slaves".

The role of master changes when the lead car links behind another car, thereby relinquishing its role as master to become a slave car. Conversely, if a car unlinks from the packet, it will resume the master role even if no other cars are linked to it.

Accordingly, the control system is configured to operate in a lead vehicle mode or a trailing vehicle mode when the control system detects that the coupling input or the coupling output is engaged with another vehicle. The lead vehicle mode causes the control system of the lead vehicle to control another vehicle coupled to the lead vehicle and the trailing vehicle mode causes the control system of the trailing vehicle to be controlled by the lead vehicle coupled to the vehicle. Thus, the system will allow a number of electric drive vehicles (cars) to link together wherein the driver in the lead car can control the motion of all the linked cars that follow the lead car.

Referring now to FIG. 5, system electronics, the host computer of the lead car controls the acceleration and deceleration of each linked vehicle. When the driver of the lead car pushes the accelerator of his car sensors 223 in the accelerator provide information about the accelerator position. This information is transferred by cable 233 to electronics in module 213, which captures and converts the format of the information and then transfers the accelerator position information to the programmable logic controller (PLC 202) by way of cable 243. The programmable logic controller then sends this status information to the host computer 201. The host computer of the lead car then imbeds this acceleration position information into the Ethernet application protocol schematically represented in FIG. 9. The lead car will then send out a packet of information containing the updated accelerator position information through PMD 504 to the rear located transceiver, XCVR 270, of the lead car where it is relayed to the front mounted transceiver, XCVR 270 of the trailing car. The signal received by this second or trailing car is retransmitted in a cascading manner to a linked to another trailing car, a third car in the packet of cars, which in its turn cascades to a further trailing fourth car, and the cascading of signal to the next trailing car ends when there are no further trailing cars to receive the signal. As a signal backup this position control information which is imbedded into the protocol can be communicated by radio frequency from the lead car to trailing cars by the host computer 201, of the lead car through cable 249 to backup transceiver 203 and antenna 204 which transmit the information to all trailing cars simultaneously. The utilization of close proximity front and rear transmitters, 270 and 275, for each car further assures the integrity of the between-car linkage protocol communication and, owing to the close proximity low transmission power, reduces the potential cross interference with other car trains.

When a trailing or linked slave car receives accelerator position information from the lead car, whether from cascaded signal transmission, XCVRs 270 and 275, or through backup transmission by way of antenna 204, this signal is then received by the host computer 201 of one or more trailing cars. The host computer 201 of each of the trailing cars then translates the accelerator position information found in the received communicated protocol packet and sends this accelerator position information to its own programmable logic controller (PLC 202) by way of cable 247. PLC 202 then compares this information to the acceleration position information provided by its own sensors in motor driver 223 via cable 233. If the compared information is different then PLC 202 sends a series of commands to electric motor driver 223 which adjusts the speed of the trailing car's electric motors to conform to that of the accelerator position information sent to each of the trailing cars by the lead car.

Conventional road vehicle steering systems, including power steering, are described in a variety of publications including automotive repair manuals and internet informational web sites (example: buy-steering.com, carbibles.com, and Wikipedia). Steering systems can be direct mechanical or they can include power assist and power assist steering systems and utilize hydraulic or electric actuators.

Figure 7:
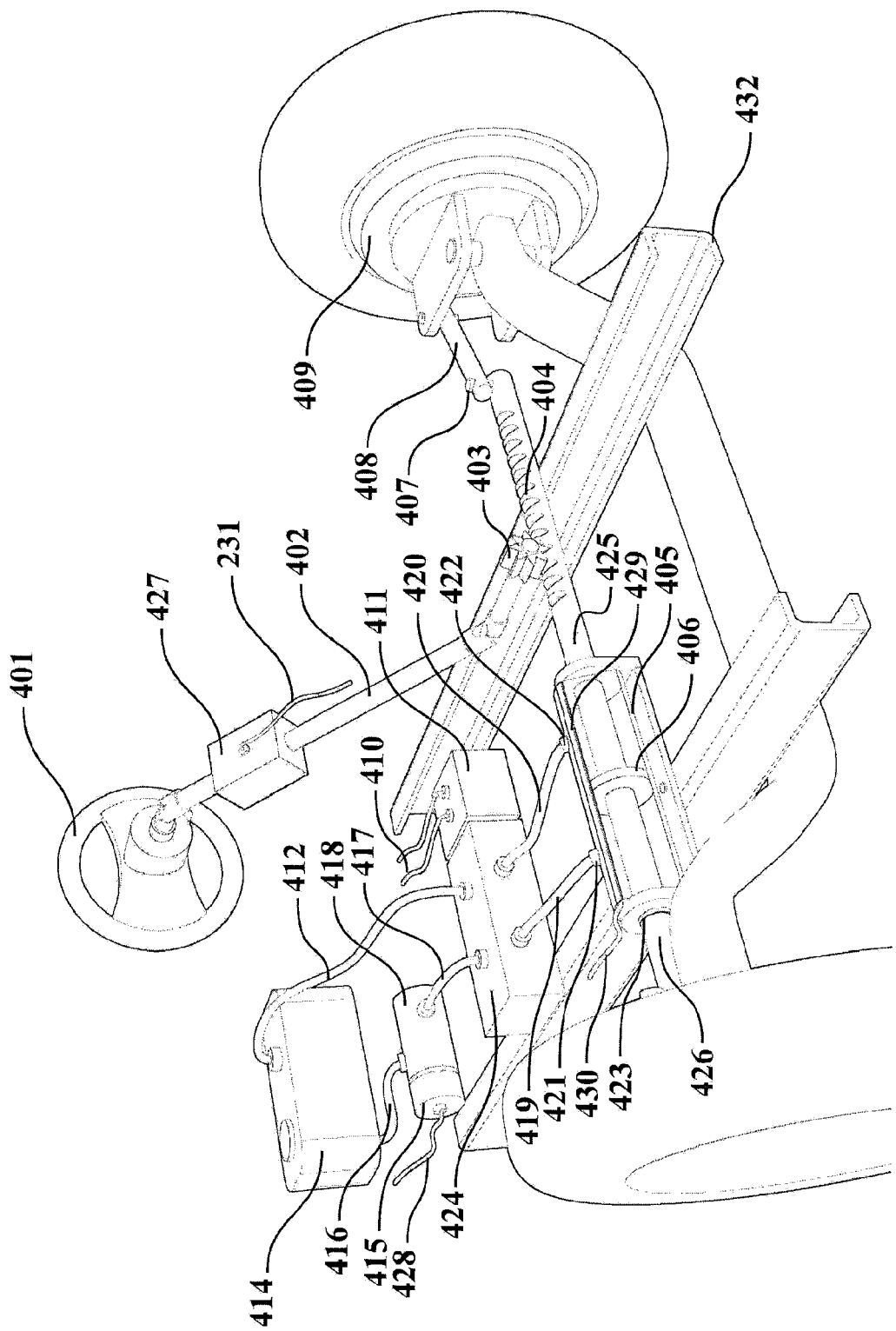
FIG. 7 illustrates a steering mechanism according to one non-limiting exemplary embodiment.

FIG. 7 is a drawing of rack-and-pinion steering with hydraulic power assist. It is adapted to include electronic control of steering for use with linked cars. Note how the steering wheel 401 is attached to a steering column 402 by passing through steering turn position sensor 427. The driver applies rotational force to steering wheel 401. The amount and direction of rotational force applied by the driver is sensed by sensors 427. The rotational force which is transferred through the steering column 402 rotates pinion gear 403. Pinion gear 403 when rotated causes the rack gear 404 embedded in the steering arm 425 to move perpendicular to frame member 431. Each end of the steering arm is attached to steering tie rods 408 by pins 407. The mechanical relationships show how rotational force applied to the steering wheel is transferred into force on the pinion gear which then moves the tie rod which repositions the angle of the front wheels, 409, relative to the vehicle frame member 432.

Hydraulic assist can be applied to a rack-and-pinion mechanical steering system. FIG. 7 shows hydraulic fluid power provide by an electrically motor driven fluid pump 418. Electric power conducted through electric cable 428 is applied to electric motor 415, which powers an integrated hydraulic pump 418. Low pressure hydraulic fluid is supplied to hydraulic pump 418 by reservoir 414 through hose 416. Pressurized fluid power from pump 418 is conducted by hydraulic hose 417 to a hydraulic directional flow control valve 424. Directional flow control valve 424 is actuated by electric valves 411 through electric power provided by dual conductor cable 410. For the car to make a right turn fluid power passing through flow control valve 424 then passes through hydraulic hose 419 to bidirectional double acting hydraulic cylinder 405. The hydraulic fluid passing into this side of hydraulic fluid cylinder 405 forces the piston 406, and steering arm 425, to move in a direction causing a "right hand" turn of the car. To turn the wheels in the opposite direction, to the driver's left, hydraulic fluid power is applied to the other side of the hydraulic cylinder 405, when flow control valve 424 is electrically switched by electric valves 411.

In addition to providing hydraulic fluid power to hydraulic cylinder 405 the flow control valve 424 allows hydraulic fluid to return as low pressure from the opposing side of the cylinder into the reservoir. When pressure is applied by means of hydraulic hose 419 then low pressure returns to the fluid reservoir 414 from the opposite side of the hydraulic cylinder 405 through hose 420. Conversely, when fluid pressure is applied through directional flow control valve 424 through hose 420 piston 406 of cylinder 405 moves in an opposite direction and fluid now flows back into the reservoir 414 by way of hose 419 through flow control valve 424 and into reservoir return hose 412.

Because the hydraulic cylinder 405 is directly in line with steering arm 425 hydraulic fluid power from the hydraulic cylinder 405 applies a mechanical force to tie rods 408 at each end of steering arm 425 and each of the tie rods 408 is mounted on the ends of the steering arm 425 thereby turning the wheel assemblies 409 in the desired direction. One can see then that electrical valve controlled movement of hydraulic piston 405 simultaneously moves both of the car's front wheel assemblies to make a turn.

Referring again to FIG. 7 and when the driver in the lead car of a number of linked cars turns steering wheel 401, electronic sensor assembly 427 detects the resulting steering wheel rotational (direction and degree of turn) information and sends a signal through cable 231 to hydraulic steering control box 211 (FIG. 5). The hydraulic steering control assembly 211 of FIG. 5 transfers this steering information to PLC 202, which then communicates this steering information to the host computer 201 of the lead car. The host computer 201 of the lead car then sends the steering information both to its own PLC 202 and to one or more linked cars by way of an electronic protocol transmission packet. This protocol packet is sent to the other linked cars by conducted or transmitted communication as described herein. The host computers 202 of the linked cars which are trailing the lead car thus receive the electronically transmitted protocol steering information. The host computer 201 of each of these linked trailing cars then transfers the received and packeted steering control information to its respective PLC 202. The PLC of the lead car and of each trailing cars then activates its own flow control valve 424 by way of electric valves 411 which have been activated by signals applied by PLCs 202 through conductors 241 to hydraulic steering control 211 by way of dual conductor 231. As described previously, the flow control valve 424 then selects high pressure hydraulic fluid to the selected side of cylinder 405, which powers the steering linkage. In this manner each trailing car begins its turn in a manner which is seen to mimics the steering of the lead car. Sensor 429, integral to hydraulic piston 405, senses the position of piston 406, which correlates to the steering angle of the front wheels. This information is then sent as feedback by way of cable 430, which is input to hydraulic steering control assembly 211 (FIG. 5). This turn feedback information is compared in PLC 202 with the desired position information received by the host computer 201 and if the turn position has been reached PLC 202 sends a valve shut off signal back to electric valve 411 which controls flow control valve 424 to stop the flow of fluid into hydraulic cylinder 405. In the manner described the host computer can control the steering angle of each of the cars and can even delay the start of turn so as to not reduce the overall turning radius of multiple linked cars making a sharp turn.

In most modern power assist steering systems the primary mechanical linkage, like that of the described "rack and pinion" design, steering hardware is coupled to the wheels in a manner which assures that a minimum level of steering capability is provided even if the hydraulic or electric power steering assist hardware were to fail.

Figure 8:
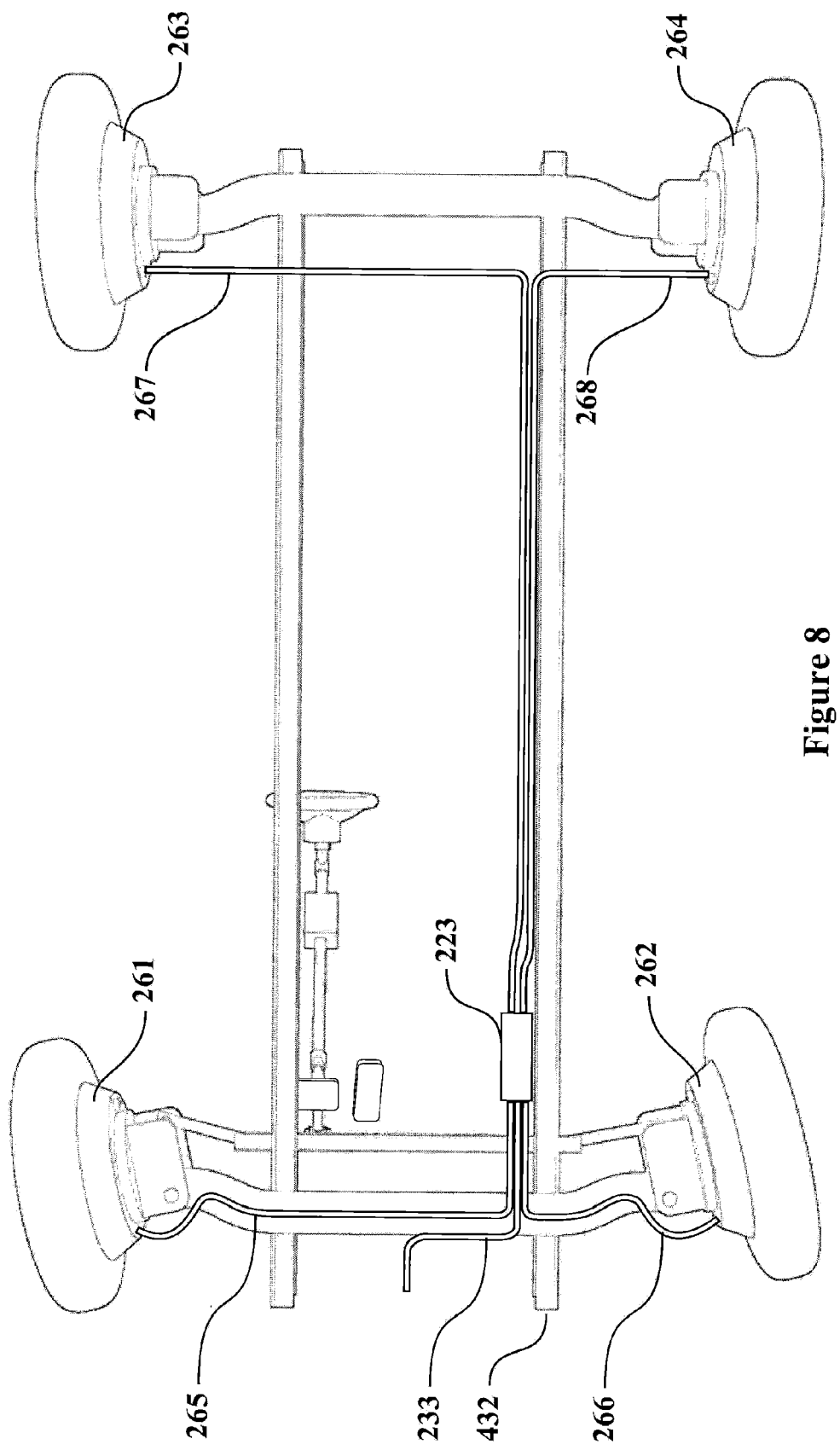
FIG. 8 illustrates a regenerative braking and an electric drive motor in accordance with one non-limiting exemplary embodiment.

The drawing of FIG. 8 shows the underside of an electric powered vehicle with motor assemblies 261, 262, 263, 264 providing electronically synchronized propulsion motors whose power and speed is controlled by way of electric motors and drivers control box 223. Acceleration and braking signals from foot pedals inside of the lead car of the linked cars is sensed and these sensing signals from brake and acceleration are connected to control box 223.

When the driver in a lead car accelerates a control signal goes to the electronics box 223, electric motor drivers and sensors, which contains electric motor power driver electronics to provide power to the four wheel motors. In addition, box 223 contains sensor electronics to sense wheel speed, operator accelerator pedal position and brake pedal pressure. Referring to the schematic of FIG. 5, control box 223 is in turn connected by cable 233 to box 213 which contains the drive motor speed control circuitry as well as the regenerative braking and emergency braking circuitry. The circuitry of hydraulic actuator control module 213 is electrically connected to the programmable logic controller (PLC 202) by way of cable 243. Signals initiated by the driver of the lead car in pressing the acceleration or depressing the braking (deceleration) pedals are transmitted from 223 through cable 233 to circuitry in hydraulic actuator control module 213 which passes this information to PLC 202 which in turn updates host computer 201 by way of Ethernet cable 247. Host computer 201 then includes this information within the same protocol packet that is used to transmit steering information and sends it along to the other linked cars as described previously in the section describing how power steering control protocol packets are transmitted to each of the linked cars. When the host computer 201 of each linked car receives the protocol packet containing the acceleration or braking information this command information is transmitted back by each cars respective Ethernet cable 247 to the individual PLCs 202 of each car. Each PLC 202 then sends the information to the drive motor speed control circuitry 213 of each car by way of cable 243. Circuitry of 213 then forwards this information by way of cable 233 to electric motor drivers of 223 which controls the power to each of the wheel motors, 261, 262, 263, and 264 by way of cables 265, 266, 267, and 268. Both synchronous acceleration and synchronous deceleration (braking) can be achieved through the described linked car electrical control sequence.

When the driver in a lead car makes a turn the wheel in the outside of the turn, with the larger turning radius has to rotate at a faster rate than the inside wheel which has a smaller arc turning radius. The host computer 201 (FIG. 5) can anticipate these requirements and provide propulsion to the outside wheel while letting the inside wheel remain unpowered. The host computer can enhance the turning of the cars trailing the lead car by delaying the start of a turn so that the turn is initiated by a trailing vehicle at the same point in the roadway that the turn was initiated by the lead car. Similarly, powering the outer turning wheel can enhance the dynamics of the turn so that the linked cars can obtain tighter street turns than might otherwise be accomplished.

As used herein non-limiting definitions of certain terms are provided:

Car—a motorized vehicle or automobile which operates on a roadway and which is independently powered and controlled in speed and direction by a driver.

Lead car—The lead car is the first or forward-most car in a packet of linked cars and the one whose driver controls both the direction and speed of the packet of linked cars.

Master car—The term, used in software control specifications, refers to the lead car.

Slave car—The terms "slave" car or "trailing" car refers to any car in a linked car packet which is not the lead car.

Driver—the operator of a car (motorized vehicle).

Electric drive control—Electric motors are generally the most accurately controlled of motor types. The term electric drive control refers broadly to the control of the car's propulsion motors as well as other car control and linkage functions in the car-train. The term electric drive control is meant to include the control of electric motors as well as other types of motors (such as hydraulic or pneumatic) when such motors are controlled by electronic hardware and software.

Engage—the dynamic processes involved when the linkage system operates to form a packet of cars.

Linkage—as a noun, linkage refers to the various equipment elements required to link cars into a packet. Multi-element linkage system refers to the multiple functional elements used in combination to link cars. Such linkage elements can include mechanical coupling, electronic control, electronic signal hardware and software, power coupling, power transfer control, radio frequency signal transmission, and associated software used for control, communication, and protocol implementation.

As a verb, link, linking or linkage refers to the processes involved in the joining of cars into a linked packet.

Packet—a group of linked cars which can move together on a roadway, all electro-mechanically linked cars in the packet being controlled by the forward most or "lead" car.

Recharging—the replenishing of an energy storage device such as a battery. Recharging sources for electric cars can be from electrical generators, motor driven or regenerative braking as an electrical power generation source.

Road—an open way for vehicles to travel

While the invention has been described with reference to one or more exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A control system for linking a plurality of electrically driven road vehicles together, comprising:
   a coupling input and a coupling output disposed on each of the plurality of vehicles, each coupling input of each vehicle being configured to releasably engage each coupling output of another vehicle to provide a mechanical and electrical coupling of the plurality of vehicles together, wherein each coupling output is configured to extend and retract from a vehicle it is secured to and each coupling output is configured to rotate about an axis each coupling output extends and retracts;
   a control system located on each of the plurality of vehicles, the control system communicating with the coupling input and the coupling output to detect when the coupling input or the coupling output is engaged with another vehicle via a respective coupling input or coupling output, the control system being further configured to operate in a lead vehicle mode or a trailing vehicle mode when the control system detects that the coupling input or the coupling output is engaged with another vehicle, wherein the lead vehicle mode causes the control system of the lead vehicle to control another vehicle coupled to the lead vehicle and the trailing vehicle mode causes the control system to be controlled by the lead vehicle coupled to the vehicle.

2. The control system of claim 1 wherein a communication protocol is required for the exchange of communication signals and control functions between each of the plurality of vehicles.

3. The control system of claim 1 wherein signals for vehicle control are transferred by electrical conduction between at least one coupling input linked to at least one coupling output, wherein the signals for vehicle control comprise anyone of acceleration, deceleration and turning.

4. The control system of claim 1 wherein control signals are communicated between the control systems of each of the plurality of vehicles by wireless electromagnetic transmitters and receivers located in each of the plurality of vehicles.

5. The control system of claim 1 wherein dynamic control of a radius of a turn for anyone of the plurality of vehicles linked to and trailing the lead vehicle is achieved by an actuator configured to reposition steerable wheels, wherein the actuator is controlled by signals received from the control system of the lead vehicle.

6. The control system of claim 5 wherein a turning radius and a timing of a start of a turning of each vehicle coupled to the lead vehicle is controlled by a rate of rotation of individual wheels of each vehicle coupled to the lead vehicle.

7. The control system of claim 1 wherein electrical power is transferred between each of the plurality of vehicles through the coupling input and the coupling output of each of the plurality of vehicles; and wherein a rate of electrical power transfer between any pair of the plurality of vehicles is controlled and measured by the control system of one of the plurality of vehicles and wherein information pertaining to an amount of power transfer information is recorded in the control system of one of the plurality of vehicles.

8. The control system of claim 1 wherein the coupling input of each of the plurality of vehicles is configured to be aligned and releaseably engaged to the coupling output of each of the plurality of vehicles by automated means.

9. The control system of claim 8 wherein each coupling input further comprises a coupling arm configured to engage a receiver of each of the coupling outputs and wherein the automated means is a hydraulic actuator.

10. The control system of claim 8 wherein the coupling arm is configured to conduct anyone of electrical power and electrical signals with the coupling output it is secured to.

11. A method of linking a plurality of electrically driven road vehicles together wherein each of the plurality of electrically driven road vehicles comprises a coupling input and a coupling output, each coupling input of each vehicle being configured to releasably engage each coupling output of another vehicle to provide a mechanical and electrical coupling of the plurality of vehicles together, wherein each coupling output is configured to extend and retract from a vehicle it is secured to and each coupling output is configured to rotate about an axis each coupling output extends and retracts, the method comprising:

coupling a first lead vehicle to at least one other vehicle by a vehicle coupling comprising: a coupling input of the first lead vehicle and a coupling output of a trailing vehicle, the coupling output of the trailing vehicle being secured to the coupling input of the first lead vehicle; and a communications link between the first lead vehicle and the trailing vehicle;

controlling the trailing vehicle by exchanging control signals between a control system located on each of the first lead vehicle and the trailing vehicle, wherein at least a portion of the control signals being exchanged are electrically transferred through the communications link between the first lead vehicle and the trailing vehicle; and controlling at least one of a braking, acceleration, a deceleration, a recharging and a steering of the trailing vehicle by inputting a command into the control system of the trailing vehicle, wherein the command originates from the control system of the first lead vehicle and the command is transferred through the communications link.

12. The method as in claim 11, wherein a communication protocol is required for the exchange of communication signals and control functions between each of the plurality of vehicles and wherein signals for vehicle control are transferred by communication between at least one coupling input linked to at least one coupling output, wherein the signals for vehicle control comprise anyone of acceleration, deceleration and turning.

13. The method as in claim 11, wherein control signals are communicated between the control systems of each of the plurality of vehicles by wireless transmission.

14. The method as in claim 11, wherein dynamic control of a radius of a turn for anyone of the plurality of vehicles linked to and trailing the lead vehicle is achieved by an actuator configured to reposition steerable wheels, wherein the actuator is controlled by signals received from the control system of the lead vehicle.

15. The method as in claim 14, wherein a turning radius and a timing of a start of a turning of each vehicle coupled to the lead vehicle is controlled by a rate of rotation of individual wheels of each vehicle coupled to the lead vehicle.

16. The method as in claim 11, wherein electrical power is transferred between each of the plurality of vehicles through the coupling input and the coupling output of each of the plurality of vehicles; and wherein a rate of electrical power transfer between any pair of the plurality of vehicles is controlled and measured by the control system of one of the plurality of vehicles and wherein information pertaining to an amount of power transfer information is recorded in the control system of one of the plurality of vehicles.

17. The method as in claim 11, wherein the coupling input of each of the plurality of vehicles is configured to be aligned and releaseably engaged to the coupling output of each of the plurality of vehicles by automated means.

18. The method as in claim 17, wherein each coupling input further comprises a coupling arm configured to engage a receiver of each of the coupling outputs and wherein the automated means is a hydraulic actuator.

19. The method of claim 17 wherein the coupling arm is configured to conduct anyone of electrical power and electrical signals with the coupling output it is secured to.

* * * * *